(12) United States Patent
Huang

(10) Patent No.: US 10,893,355 B2
(45) Date of Patent: Jan. 12, 2021

(54) EARPHONE

(71) Applicant: SHENZHEN MEES HI-TECH CO., LTD., Shenzhen (CN)

(72) Inventor: Yuanqing Huang, Shenzhen (CN)

(73) Assignee: SHENZHEN MEES HI-TECH CO., LTD., Shenzhen (CN)

( * ) Notice: Subject to any disclaimer, the term of this patent is extended or adjusted under 35 U.S.C. 154(b) by 0 days.

(21) Appl. No.: 16/744,712

(22) Filed: Jan. 16, 2020

(65) Prior Publication Data
US 2020/0374621 A1    Nov. 26, 2020

(51) Int. Cl.
| H04R 1/10 | (2006.01) |
| H01R 12/71 | (2011.01) |
| H02J 7/00 | (2006.01) |
| H01R 13/24 | (2006.01) |
| H04R 1/08 | (2006.01) |
| H04R 1/34 | (2006.01) |

(52) U.S. Cl.
CPC ......... *H04R 1/1075* (2013.01); *H01R 12/714* (2013.01); *H01R 13/24* (2013.01); *H02J 7/0045* (2013.01); *H04R 1/08* (2013.01); *H04R 1/1016* (2013.01); *H04R 1/1025* (2013.01); *H04R 1/1041* (2013.01); *H04R 1/342* (2013.01); *H04R 2420/07* (2013.01)

(58) Field of Classification Search
CPC ...... H04R 1/1075; H04R 1/08; H04R 1/1016; H04R 1/1025; H04R 1/1041; H04R 1/342; H04R 2420/07; H01R 12/714; H01R 13/24; H02J 7/0045
USPC ... 381/74, 87, 335, 386, 395, 311, 150, 122, 381/91, 111, 355; 455/573, 572
See application file for complete search history.

(56) References Cited

U.S. PATENT DOCUMENTS

| 2007/0032130 A1* | 2/2007 | Yoshino | H01Q 1/273 439/578 |
| 2013/0028434 A1* | 1/2013 | Sibbald | H04R 1/1091 381/71.6 |
| 2016/0073189 A1* | 3/2016 | Linden | H04R 1/1025 381/74 |
| 2017/0026738 A1* | 1/2017 | Tang | H04R 1/1091 |
| 2017/0094398 A1* | 3/2017 | Cousins | B65D 25/02 |
| 2017/0180897 A1* | 6/2017 | Perianu | H04R 1/1025 |
| 2018/0109052 A1* | 4/2018 | Li | H01R 24/58 |
| 2019/0069104 A1* | 2/2019 | Lindberg | H04R 25/604 |

* cited by examiner

*Primary Examiner* — Vivian C Chin
*Assistant Examiner* — Con P Tran

(57) ABSTRACT

The earphone comprises a main housing; a cover; a speaker module; a circuit module; and a power supply. The cover is buckled on the main housing. The speaker module, the circuit module, and the power supply are disposed within a space enclosed by the main housing and the cover. The speaker electrical connector is used to achieve an electrical connection between the speaker body and the circuit module in an elastic contact manner. The battery electrical connector is used to achieve electrical connection with the circuit board in the elastic contact manner.

10 Claims, 19 Drawing Sheets

EARPHONE

RELATED APPLICATION

This application claims the benefit of the Chinese Patent Application CN201910434684.9 filed May 23, 2019, which is incorporated herein by reference in its entirety.

FIELD OF THE INVENTION

The disclosure relates to the technical field of audio equipment, in particular, to an earphone.

BACKGROUND OF THE INVENTION

Earphones are sophisticated audio devices that are usually connected to electronic devices such as smartphones, tablets, and MP3s in a wired or wireless manner. They are mainly used to achieve conversion between electrical signals and sound waves.

In the prior art, the electronic components of the earphones are usually connected by welding, and the structural parts that affect the seal, such as the housing, are usually assembled by hot pressing and bonding. Since the parts fixed by welding, hot pressing, and bonding are scrapped as soon as they are disassembled, the parts of the earphone cannot be replaced after the earphone is manufactured.

Failure to replace parts of a manufactured earphone can cause the problems of (1) disability in eliminating problems in terms of the quality of the earphone by replacing the part if a part is found to be defective in the testing process of earphone production, and (2) disability in eliminating malfunction of the earphone by replacing the part if a malfunction occurs during the use of the earphone.

OBJECTS AND SUMMARY OF THE INVENTION

The disclosure discloses an earphone, which aims to optimize the structure of the earphone, so as to reduce the use of welding, hot pressing and bonding, so that parts of the earphone may be freely replaced.

In some embodiments of the disclosure, an earphone includes a main housing, a cover, a speaker module, a circuit module, and a power supply module, wherein the cover is buckled on the main housing, and the speaker module, the circuit module, and the power supply module are disposed within a space enclosed by the main housing and the cover;

the main housing is provided with a first snap hole seat, a second snap hole seat, a third snap hole seat and a fourth snap hole seat, the first snap hole seat being opposite to the second snap hole seat, the third snap hole seat being opposite to the fourth snap hole seat; a distance between the first snap hole seat and the third snap hole seat is equal to a distance between the second snap hole seat and the third snap hole seat; a distance between the first snap hole seat and the fourth snap hole seat is equal to a distance between the second snap hole seat and the fourth snap hole seat;

the cover is provided with a first snap buckle seat, a second snap buckle seat, a third snap buckle seat and a fourth snap buckle seat, the first snap buckle seat being opposite to the second snap buckle seat, the third snap buckle seat being opposite to the fourth snap buckle seat; a distance between the first snap buckle seat and the third snap buckle seat is equal to a distance between the second snap buckle seat and the third snap buckle seat; a distance between the first snap buckle seat and the fourth snap buckle seat is equal to a distance between the second snap buckle seat and the fourth snap buckle seat;

the first snap buckle seat is buckled with the first snap hole seat, the second snap buckle seat is buckled with the second snap hole seat, the third snap buckle seat is buckled with the third snap hole seat, and the fourth snap buckle seat is buckled with the fourth snap hole seat, so that the cover is buckled on the main housing;

the speaker module includes a speaker body and a speaker electrical connector, wherein the speaker body is used to convert an electrical signal into a sound wave, and the speaker electrical connector is used to achieve an electrical connection between the speaker body and the circuit module in an elastic contact manner;

the circuit module includes a circuit board, a microphone and a touch assembly, wherein the microphone is fixed on the circuit board and is electrically connected to the circuit board, and the circuit board is electrically connected to the speaker module, the power supply module and the touch assembly in the elastic contact manner;

the power supply module includes a battery and a charging board, wherein the battery is used to store an electric energy, and the charging board is used to introduce an external charging power source into the circuit module; one end of the battery is provided with a battery electrical connector; the battery electrical connector is used to achieve an electrical connection with the circuit board in the elastic contact manner; one side of the charging board is provided with a charging board electrical connector, and the other side of the charging board is provided with one or more charging couplers; the charging board electrical connector is used to achieve an electrical connection with the circuit board in the elastic contact manner; the charging couplers are used to connect externally a charging power source;

the circuit board is provided with two first metal spring pins, two second metal spring pins, two third metal spring pins, and two fourth metal spring pins, wherein the two first metal spring pins, the two second metal spring pins, and the two third metal spring pins are mounted on one face of the circuit board, and the two fourth metal spring pins are mounted on the other face of the circuit board;

one of the two first metal spring pins elastically contacts a positive electrode corresponding to the speaker electrical connector, and the other of the two first metal spring pins elastically contacts a negative electrode corresponding to the speaker electrical connector, so that the circuit board achieves an electrical connection with the speaker body;

one of the two second metal spring pins elastically contacts a positive electrode corresponding to the battery electrical connector, and the other of the two second metal spring pins elastically contacts a negative electrode corresponding to the battery electrical connector, so that the circuit board achieves an electrical connection with the battery;

one of the two third metal spring pins elastically contacts a positive electrode corresponding to the charging board electrical connector, and the other of the two third metal spring pins elastically contacts a negative electrode corresponding to the charging board electrical connector, so that the circuit board achieves an electrical connection with the charging board;

one of the two fourth metal spring pins elastically contacts a positive electrode corresponding to the touch assembly, and the other of the two fourth metal spring pins elastically contacts a negative electrode corresponding to the touch assembly, so that the circuit board achieves an electrical connection with the touch assembly.

It should be understood that both the foregoing general description and the following detailed description are illustrative and explanatory and are intended to provide further explanation of the claimed disclosure.

BRIEF DESCRIPTION OF FIGURES

The drawings described herein are used to further understand the disclosure and form a part thereof. The exemplary embodiments of the disclosure and the descriptions thereof are used to explain the disclosure and do not constitute a limitation on the disclosure. In the drawings:

FIGS. 11 to 14 illustrate a circuit module of the earphone in FIG. 4, wherein FIG. 11 is a perspective view of a circuit board of the circuit module;

FIG. 12 is a top view of the circuit board of the circuit module;

FIG. 13 is a perspective view of a microphone of the circuit module;

FIG. 14 is a perspective view of a touch assembly of the circuit module.

FIG. 15 is a perspective view of a battery of the power supply module;

FIG. 16 is a perspective view of a charging board of the power supply module;

FIG. 17 is a perspective view of a magnetic block of the power supply module;

FIG. 18 is a perspective view of the ear cap;

FIG. 19 is a cross-section view of the ear cap along a dotted line B-B in FIG. 18.

DETAILED DESCRIPTION OF THE EMBODIMENTS

Figure 1:
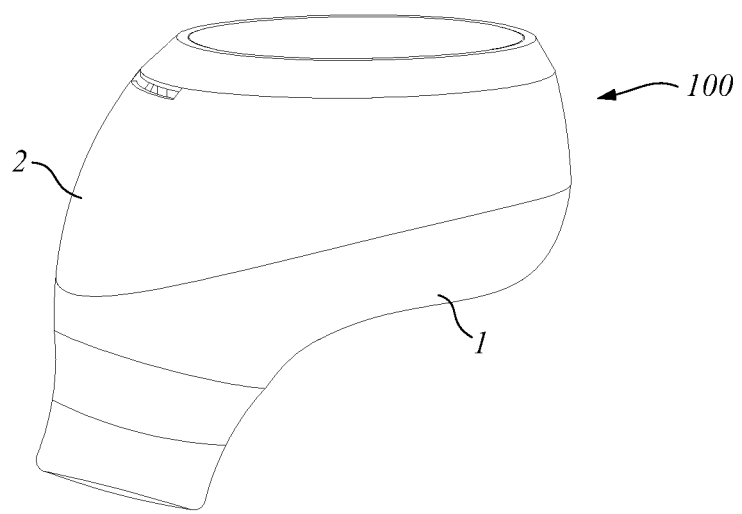
FIG. 1 is a perspective view of an earphone in an embodiment of the disclosure.

The exemplary embodiments disclosed in the disclosure will now be described in detail with reference to the accompanying drawings. For a brief description with reference to the drawings, the same or equivalent components may have the same reference numerals, and descriptions thereof will not be repeated. Generally, suffixes such as "module" and "unit" may be used to refer to an element or a component. Such suffixes used herein are only for the convenience of describing this specification, and the suffix itself is not intended to give any special meaning or function. In the exemplary embodiments disclosed in the disclosure, for the sake of brevity, what is commonly known to those skilled in the relevant art is generally omitted. The drawings are used to help easily understand various technical features, and it should be understood that the embodiments given herein are not limited by the drawings. Therefore, the disclosure should be construed to extend to any changes, equivalents, and substitutions other than those specifically indicated in the drawings. It is understood that although terms "first", "second", etc. may be used herein to describe various elements, these elements should not be limited by these terms. These terms are usually only used to distinguish one element from another. It will be understood that when an element is referred to as being "connected to" another element, the element may be connected to the other element or intervening elements may also be present. In contrast, when an element is referred to as being "directly connected to" another element, there are no intervening elements present. The terms "including" or "having" are used herein and it should be understood that they are intended to indicate the existence of several components, functions or steps disclosed in the specification. And it should also be understood that more or fewer components, functions or steps may also be used.

Figure 2:
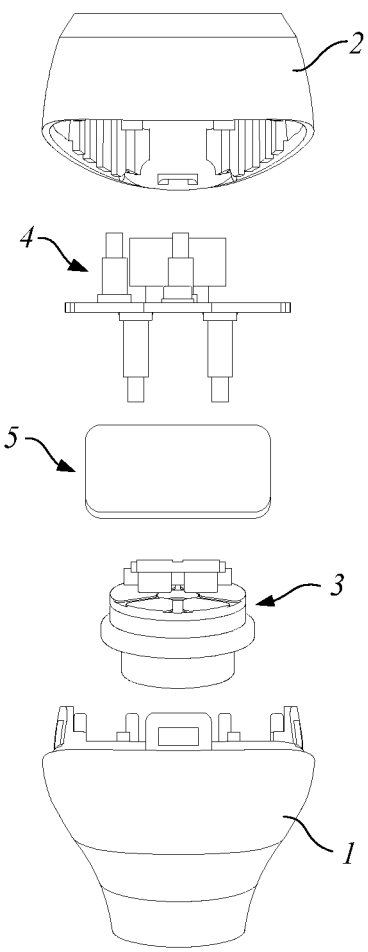
FIG. 2 is an exploded view of the earphone shown in FIG. 1.

As shown in FIGS. 1 to 2, an embodiment of the disclosure discloses an earphone 100 where the parts may be freely replaced.

With reference to FIGS. 1 and 2, in a possible embodiment, the earphone 100 includes a main housing 1, a cover 2, a speaker module 3, a circuit module 4, and a power supply module 5. Among them, the cover 2 is buckled on the main housing 1, and the speaker module 3, the circuit module 4, and the power supply module 5 are disposed within a space enclosed by the main housing 1 and the cover 2. The circuit module 4 is electrically connected with the speaker module 3 and the power supply module 5 in an elastic contact manner.

In above embodiment, the cover 2 is buckled on the main housing 1, so that after the earphone 100 is manufactured, the cover 2 may be detached from the main housing 1 to facilitate the detection of the speaker module 3, the circuit module 4, and the power supply module 5. Since the circuit module 4 is electrically connected with the speaker module 3 and the power supply module 5 in an elastic contact manner, the circuit module 4 may be separated from the speaker module 3 and the power supply module 5 in a manner that does not damage the circuit, which facilitates repairing or replacement of the speaker module 3, the circuit module 4, and the power supply module 5. The earphone 100 in the above embodiment has the advantages of simple structure, convenient assembly, and free replacement of parts.

As shown in FIGS. 3 to 19, another embodiment of the disclosure discloses an earphone 200 where the parts may be freely replaced.

Figure 3:
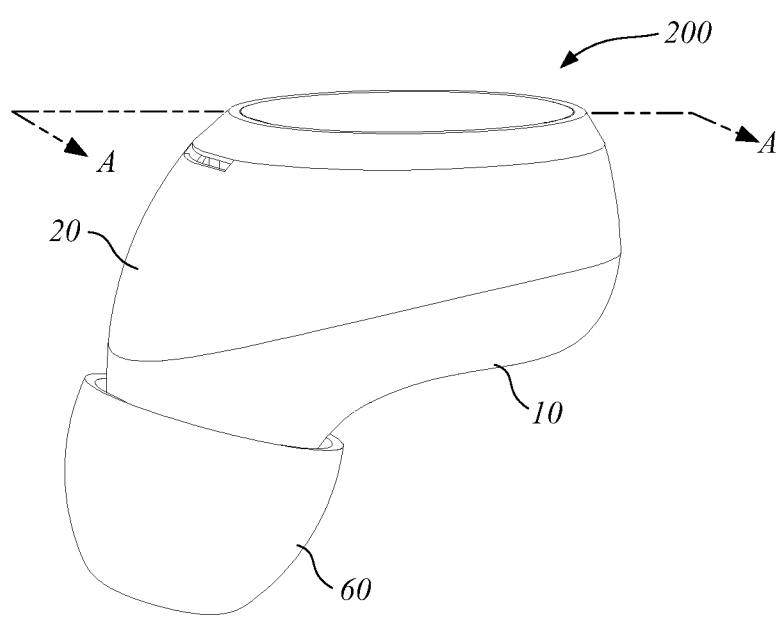
FIG. 3 is a perspective view of an earphone in another embodiment of the disclosure.
Figure 4:
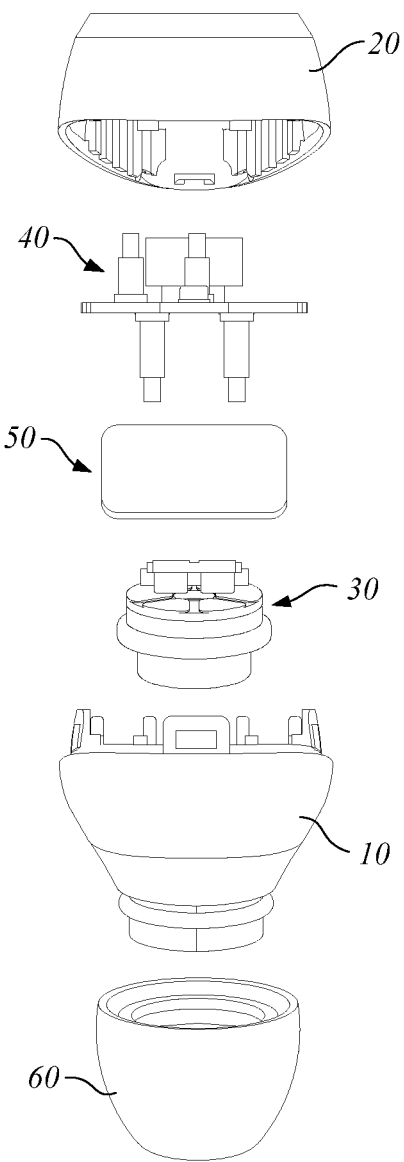
FIG. 4 is an exploded view of the earphone shown in FIG. 3.

With reference to FIGS. 3 and 4, in a possible embodiment, the earphone 200 includes a main housing 10, a cover 20, a speaker module 30, a circuit module 40, a power supply module 50, and an ear cap 60. Among them, the cover 20 is buckled on the main housing 10, and the speaker module 30, the circuit module 40, and the power supply module 50 are disposed within a space enclosed by the main housing 10 and the cover 20. The circuit module 40 is electrically connected with the speaker module 30 and the power supply module 50 in an elastic contact manner. The ear cap 60 is sleeved on the main housing 10. When the earphone 200 is worn, the ear cap 60 is inserted into the ear to improve the comfort and firmness of wearing the earphone 200.

In a possible embodiment, the circuit module 40 is elastically contacted with the speaker module 30 and the power supply module 50 through a metal spring pin, so that the circuit module 40 is electrically connected to the speaker module 30 and the power supply module 50, respectively. The metal spring pin includes a metal sleeve, a metal thimble, and a metal spring. The metal spring is mounted in the metal sleeve. One end of the metal thimble is built in the metal sleeve and abuts against the metal spring. When the other end of the metal thimble is compressed, the metal thimble moves on the metal sleeve and squeezes the metal spring. When the pressure on the other end of the metal thimble disappears, the metal spring recovers and pushes the metal thimble back to the position before compression. Since the metal spring pin is made of a metal material, current and electrical signals may be transmitted through the metal spring pin.

Figure 5:
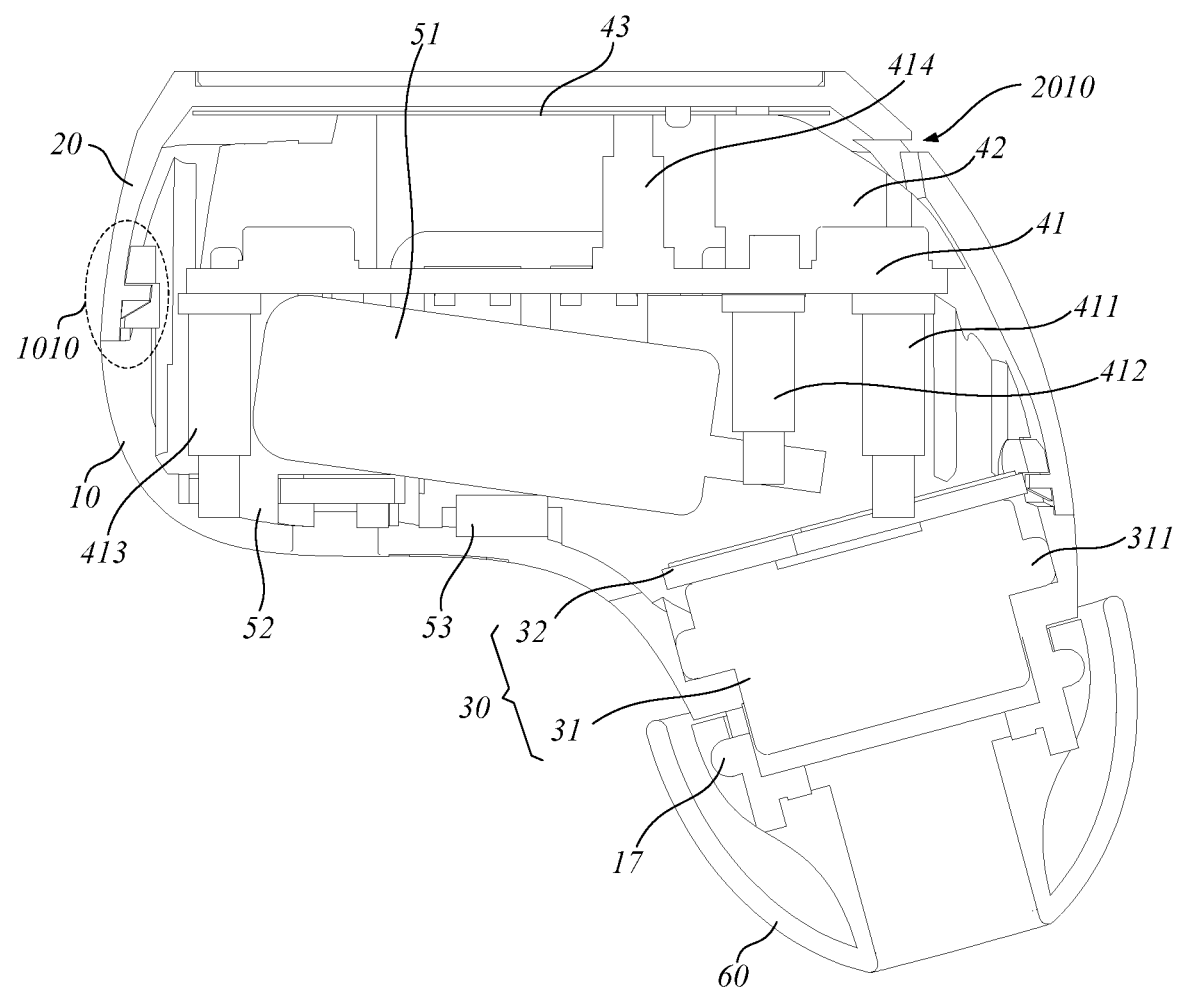
FIG. 5 is a cross-sectional view of the earphone shown in FIG. 3 along a dotted line A-A in FIG. 3.

With reference to FIGS. 4 and 5, in a possible embodiment, the main housing 10 is formed with a speaker receiving cavity 11 bulging outward and a main receiving cavity 12 communicating with the speaker receiving cavity 11. The speaker module 30 is mounted within the speaker receiving cavity 11. The circuit module 40 and the power supply module 50 are mounted within the main receiving cavity 12, and the power supply module 50 is located between the speaker module 30 and the circuit module 40. The main housing 10 is fixed to the cover 20 by one or more buckling structures 1010. The buckling structures 1010 include snap buckle seats and snap hole seats; the snap buckle seat is provided with one or more buckles, and the snap hole seat is provided with one or more snap buckle mounting holes, the buckles being engaged into the snap buckle mounting holes such that the snap buckle seat is buckled with the snap hole seat to further fix the main housing 10 to the cover 20. When the snap buckle seat of the buckling structures 1010 is disposed on the main housing 10, the snap hole seat of the buckling structure 1010 is disposed on the cover 20. When the snap buckle seat of the buckling structures 1010 is disposed on the cover 20, the snap hole seat of the buckling structure 1010 is disposed on the main housing 10.

With reference to FIGS. 6 to 9, in a possible embodiment, the main housing 10 is provided with a first snap hole seat 131, a second snap hole seat 132, a third snap hole seat 133 and a fourth snap hole seat 134; the cover 20 is provided with a first snap buckle seat 231, a second snap buckle seat 232, a third snap buckle seat 233 and a fourth snap buckle seat 234. Among them, the first snap buckle seat 231 is buckled with the first snap hole seat 131, the second snap buckle seat 232 is buckled with the second snap hole seat 132, the third snap buckle seat 233 is buckled with the third snap hole seat 133, and the fourth snap buckle seat 234 is buckled with the fourth snap hole seat 134, so that the cover 20 is buckled on the main housing 10.

With continuous reference to FIGS. 6 to 9, in a possible embodiment, the first snap hole seat 131 is opposite to the second snap hole seat 132, and the third snap hole seat 133 is opposite to the fourth snap hole seat 134. A distance between the first snap hole seat 131 and the third snap hole seat 133 is equal to a distance between the second snap hole seat 132 and the third snap hole seat 133. A distance between the first snap hole seat 131 and the fourth snap hole seat 134 is equal to a distance between the second snap hole seat 132 and the fourth snap hole seat 134. The first snap buckle seat 231 is opposite to the second snap buckle seat 232, and the third snap buckle seat 233 is opposite to the fourth snap buckle seat 234. A distance between the first snap buckle seat 231 and the third snap buckle seat 233 is equal to a distance between the second snap buckle seat 232 and the third snap buckle seat 233. A distance between the first snap buckle seat 231 and the fourth snap buckle seat 134 is equal to a distance between the second snap buckle seat 232 and the fourth snap buckle seat 234. The position settings for the first snap hole seat 131, the second snap hole seat 132, the third snap hole seat 133, the fourth snap hole seat 134, the first snap buckle seat 231, the second snap buckle seat 232, the third snap buckle seat 233, and the fourth snap buckle seat 234 facilitate a balanced force after the main housing 10 is buckled to the cover 20.

With continuous reference to FIGS. 6 to 9, in a possible embodiment, a housing on the main housing 10 buckled to the cover 20 is provided inside with a positioning step 135. The housing on the cover 20 buckled to the main housing 10 is provided inside with one or more positioning bumps 235. During the process of buckling the cover 20 to the main housing 10, the positioning bumps 235 may be aligned with the positioning step 135 to initially achieve the positioning of the cover 20 with respect to the main housing 10. After the cover 20 is buckled to the main housing 10, the positioning bumps 235 abut on the positioning step 135, which facilitates sealing a joint between the cover 20 and the main housing 10.

With continuous reference to FIGS. 6 to 9, in a possible embodiment, a housing where the main housing 10 is buckled to the cover 20 is provided inside with a first buckling positioning column 121 and a second buckling positioning column 122. The first buckling positioning column 121 and the second buckling positioning column 122 are located at one side of the third snap hole seat 133, respectively. The housing where the main housing 10 is buckled to the cover 20 is provided inside with a first buckling positioning hole 221 and a second buckling positioning hole 222. The first buckling positioning hole 221 and the second buckling positioning hole 222 are located at one side of the third snap buckle seat 233, respectively. During the processing of buckling the main housing 10 to the cover 20, the first buckling positioning column 121 is inserted into the first buckling positioning hole 221, and the second buckling positioning column 122 is inserted into the second buckling positioning hole 222, so as to further achieve an accurate positioning between the cover 20 and the main housing 10, which facilitates a quick buckling between the cover 20 and the main housing 10.

Figure 10:
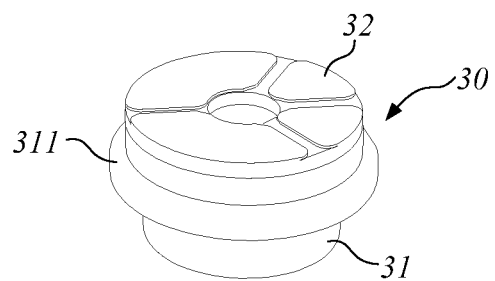
FIG. 10 illustrates a speaker module of the earphone in FIG. 4.
Figure 11:
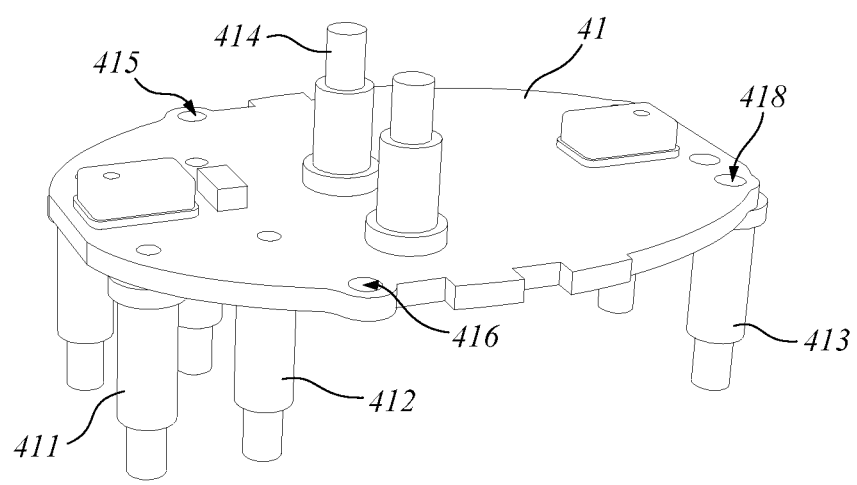
Figure 12:
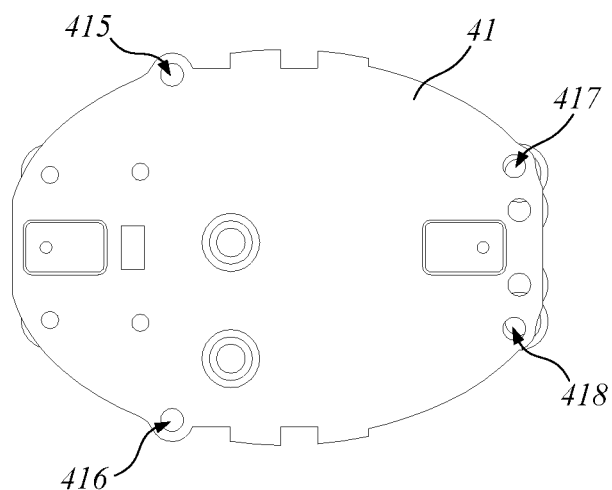
Figure 13:
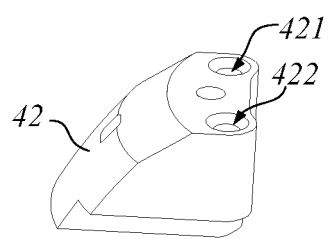
Figure 14:
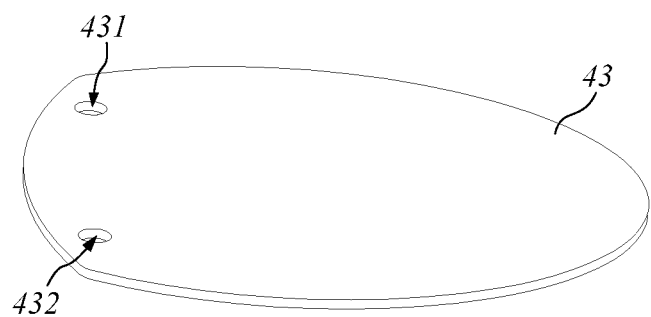

With reference to FIGS. 4, 5 and 10, in a possible embodiment, the speaker module 30 includes a speaker body 31 and a speaker electrical connector 32. The speaker body 31 is used to convert an electrical signal into a sound wave, and the speaker electrical connector 32 is used to realize an electrical connection between the speaker body 31 and the circuit module 40 in an elastic contact manner.

With continuous reference to FIGS. 4, 5 and 10, in a possible embodiment, the speaker body 31 is provided outside with a positioning shoulder 311. The positioning shoulder 311 is used to define a position of the speaker module 30 in the speaker receiving cavity 11.

Figure 6:
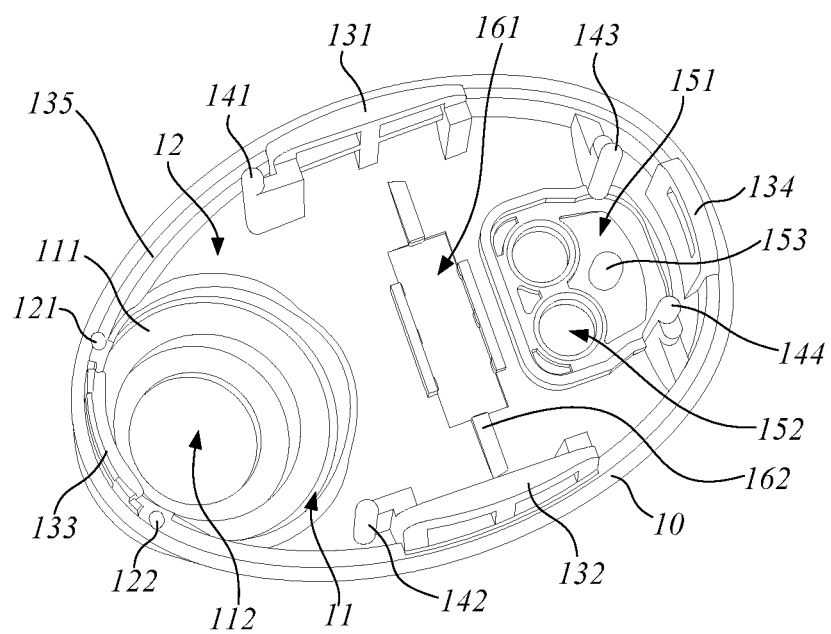
FIG. 6 illustrates an internal construction of a main housing of the earphone in FIG. 3.
Figure 7:
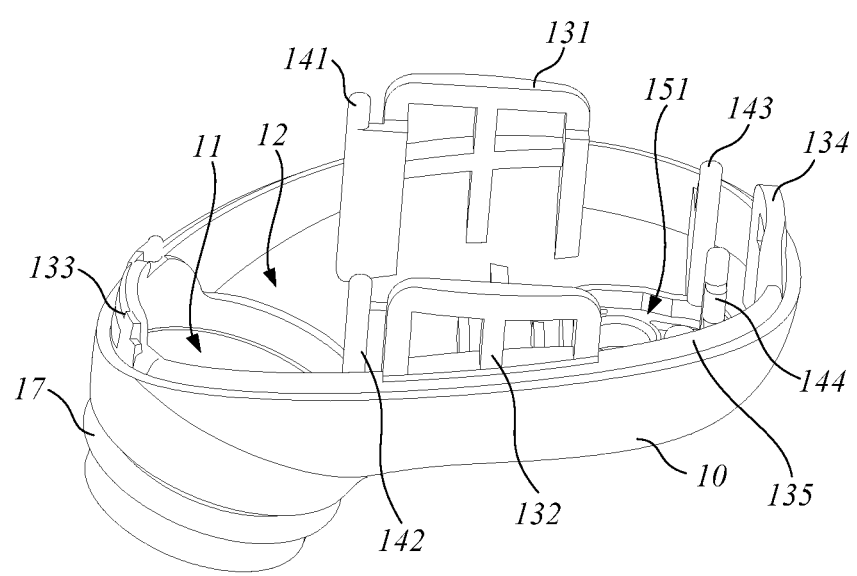
FIG. 7 similarly illustrates an internal construction of a main housing of the earphone in FIG. 3; and some details not shown in FIG. 6 can be observed.
Figure 8:
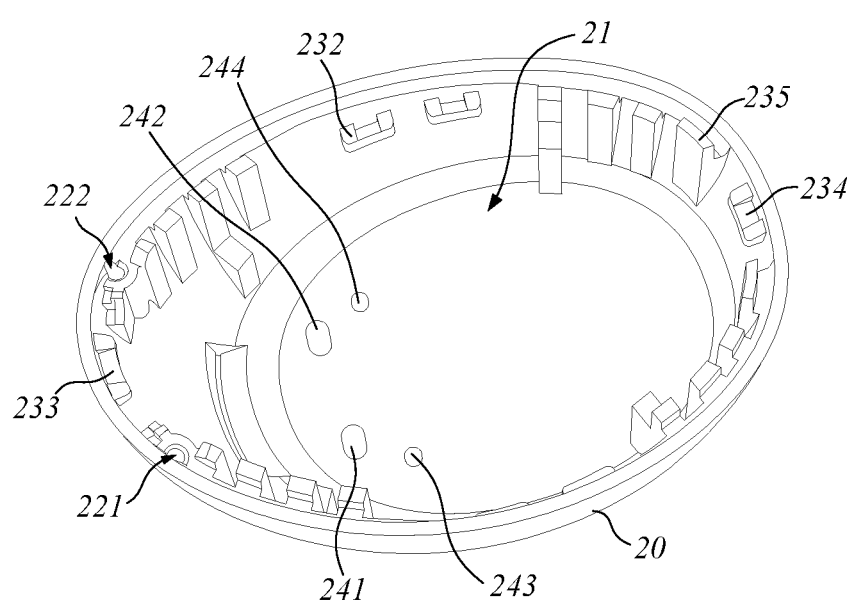
FIG. 8 illustrates an internal construction of a cover of the earphone in FIG. 3.
Figure 9:
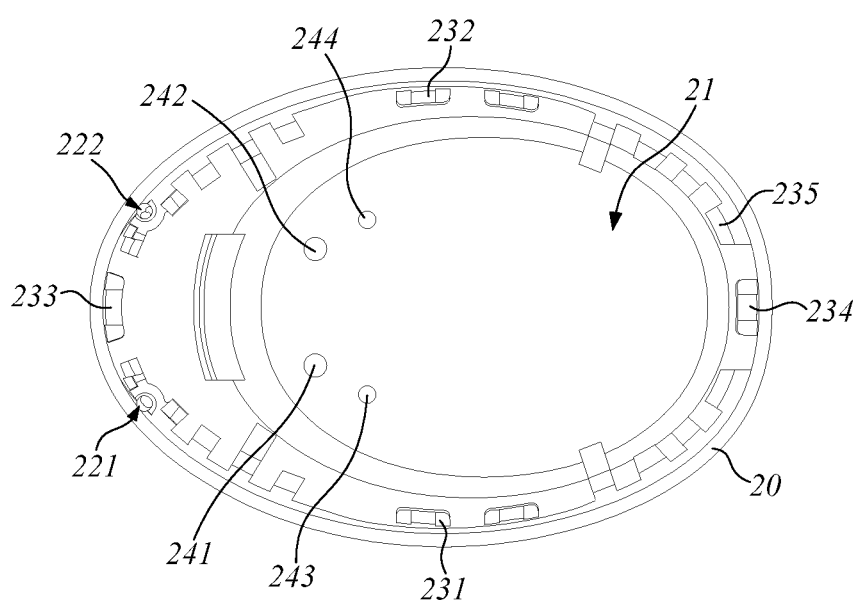
FIG. 9 similarly illustrates an internal construction of a cover of the earphone in FIG. 3; and some details not shown in FIG. 8 can be observed.

With continuous reference to FIGS. 5, 6 and 10, in a possible embodiment, the speaker receiving cavity 11 is formed inside with a carry step 111. The positioning shoulder 311 abuts on the carry step 111 to further define a position of the speaker module 30 in the speaker receiving cavity 11. Optionally, in order to securely install the speaker module 30 in the speaker receiving cavity 11, the positioning shoulder 311 is bonded with the carry step 111.

With continuous reference to FIGS. 5, 6 and 10, in a possible embodiment, a bottom of the speaker receiving cavity 11 is provided with one or more sound reinforcement holes 112, and sound waves generated by the speaker module 30 are led out through the sound reinforcement holes 112.

With reference to FIGS. 4, 5 and FIGS. 10 to 14, in a possible embodiment, the circuit module 40 includes a circuit board 41, a microphone 42 and a touch assembly 43. The microphone 42 is fixed on the circuit board 41 and is electrically connected to the circuit board 41. The circuit board 41 is electrically connected to the speaker module 30, the power supply module 50 and the touch assembly 43 in the elastic contact manner. The power supply module 50 is electrically connected to the circuit board 41 in the elastic contact manner, so that the power supply module 50 supplies power to the circuit board 41. Since the circuit board 41 is electrically connected to the speaker module 30 and the touch assembly 43 in the elastic contact manner, the power supply module 50 may indirectly supply power to the speaker module 30 and the touch assembly 43. A circuit or chip for controlling the speaker module 30, the microphone 42, the touch assembly 43 and the power supply module 50 is integrated on the circuit board 41. The microphone 42 is used to convert sound waves into electrical signals. The touch assembly 43 is used for implementing touch, for example, controlling the earphone 200 to play audio, pause audio, switch audio, answer a call, make a call, and the like.

With continuous reference to FIGS. 4, 5 and FIGS. 10 to 14, in a possible embodiment, the earphone 200 communicates with electronic devices such as a smart phone, a tablet computer, and an MP3 in a wireless communication manner, for example, a Bluetooth communication manner. A chip of the earphone 200 for implementing wireless communication is integrated on the circuit board 41, and an antenna of the earphone 200 for implementing wireless communication is integrated on the touch assembly 43.

With reference to FIGS. 5 to 7 and FIGS. 11 and 12, in a possible embodiment, the main receiving cavity 12 is provided inside with a first supporting column 141, a second supporting column 142, a third supporting column 143, and a fourth supporting column 144. A distance from the first supporting column 141 and the second supporting column 142 to the speaker receiving cavity 11 is shorter than a distance from the third supporting column 143 and the fourth supporting column 144 to the speaker receiving cavity 11.

With continuous reference to FIGS. 5 to 7 and FIGS. 11 and 12, in a possible embodiment, the circuit board 41 is provided with a first mounting hole 415, a second mounting hole 416, a third mounting hole 417, and a fourth mounting hole 418. A distance between the first mounting hole 415 and the second mounting hole 416 is equal to a distance between the first supporting column 141 and the second supporting column 412. A distance between the third mounting hole 417 and the fourth mounting hole 418 is equal to a distance between the third supporting column 143 and the fourth supporting column 144. A distance between the first mounting hole 415 and the third mounting hole 417 is equal to a distance between the first supporting column 141 and the third supporting column 143. A distance between the second mounting hole 416 and the fourth mounting hole 418 is equal to a distance between the second supporting column 142 and the fourth supporting column 144.

During the process of mounting the circuit board 41, the first supporting column 141 is inserted into the first mounting hole 415, the second supporting column 142 is inserted into the second mounting hole 416, the third supporting column 143 is inserted into the third mounting hole 417, and the fourth supporting column 144 is inserted into the fourth mounting hole 418, so that the first supporting column 141, the second supporting column 142, the third supporting column 143, and the fourth supporting column 144 support and position the circuit board 41, thereby further defining the position of the circuit board 41 within the main receiving cavity 12. The circuit board 41 is supported and the position of the circuit board 41 is defined by the first supporting column 141, the second supporting column 142, the third supporting column 143, and the fourth supporting column 144, so that a space for receiving the power supply module 50 may be reserved between the circuit board 41 and the main housing 10.

With reference to FIGS. 5, 8, 9 and FIGS. 13 and 14, in a possible embodiment, the cover 20 is provided inside with a first positioning column 241, a second positioning column 242, a third positioning column 243, and a fourth positioning column 244. The microphone 42 is provided with a first positioning hole 421 and a second positioning hole 422. During the process of buckling the cover 20 to the main housing 10, the first positioning column 241 is inserted in the first positioning hole 421, and the second positioning column 242 is inserted in the second positioning hole 422, so that a position of the microphone 42 is fixed relative to the cover 20 and the circuit board 41, thereby avoiding welding or bonding the microphone 42 to the cover 20. The cover 20 is formed with a sound guide channel 2010, and the sound guide channel 2010 faces towards the microphone 42, so that a sound wave reaches the microphone 42 through the sound guide channel 2010 for facilitating capturing of the sound wave by the microphone 42 and conversion of it into an electrical signal.

The touch assembly 43 is provided with a third positioning hole 431 and a fourth positioning hole 432. The third positioning hole 431 and the fourth positioning hole 432 are located at one end of the touch assembly 43. During the process of mounting the touch assembly 43 into the cover 20, the third positioning column 243 is inserted into the third positioning hole 431, and the fourth positioning column 244 is inserted into the fourth positioning hole 432, so as to further define the position of the touch assembly 43 within the cover 20.

Figure 15:
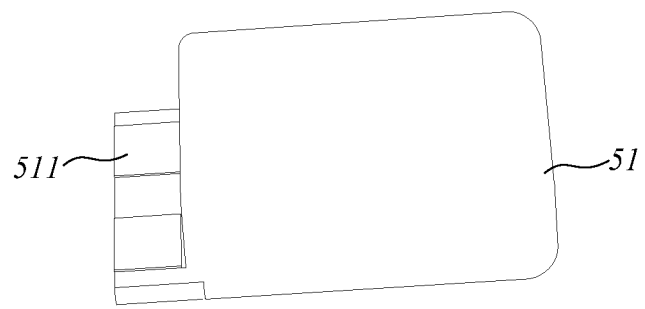
FIGS. 15 to 17 illustrate a power supply module of the earphone in FIG. 4.
Figure 16:
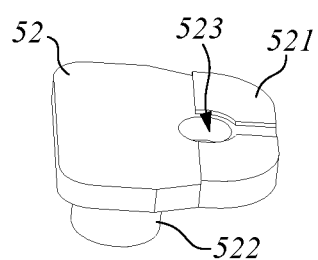

With reference to FIGS. 5, 15 and 16, in a possible embodiment, the power supply module 50 includes a battery 51 and a charging board 52. The battery 51 is used to store an electric energy. The charging board 52 is used to introduce an external charging power source into the circuit module 40. One end of the battery 51 is provided with a battery electrical connector 511. The battery electrical connector 511 is used to achieve electrical connection with the circuit board 41 in the elastic contact manner. One side of the charging board 52 is provided with a charging board electrical connector 521, and the other side of the charging board 52 is provided with one or more charging couplers 522. The charging board electrical connector 521 is used to achieve electrical connection with the circuit board 41 in the elastic contact manner. The charging couplers 522 are used to connect externally a charging power source. Under the control of the circuit board 41, a charging power source is introduced into the battery 51 via the charging board 52 and the circuit board 41 to charge the battery 51.

With reference to FIGS. 6 and 16, in a possible embodiment, the main housing 10 is formed inside with a charging board receiving groove 151, and the charging board receiving groove 151 is used to mount the charging board 52. The charging board receiving groove 151 is provided inside with one or more through holes 152, and the through holes 152 are used to mount the charging couplers 522, so that the charging couplers 522 are capable of externally connecting the charging power source. The charging board receiving groove 151 is provided inside with a charging board positioning column 153. The charging board 52 is provided with a charging board positioning hole 523. During the process of mounting the charging board 52 into the charging board receiving groove 151, the charging board positioning column 153 is inserted into the charging board positioning hole 523, so as to further define a position of the charging board 52.

With reference to FIGS. 5, 10 to 12 and FIGS. 14 to 16, in a possible embodiment, the circuit board 41 is provided with two first metal spring pins 411, two second metal spring pins 412, two third metal spring pins 413, and two fourth metal spring pins 414. The two first metal spring pins 411, the two second metal spring pins 412, and the two third metal spring pins 413 are mounted on one face of the circuit board 41, and the two fourth metal spring pins 414 are mounted on the other face of the circuit board 41. The two first metal spring pins 411 are used to elastically contact the speaker module 30 to realize the electrical connection between the circuit board 41 and the speaker module 30. The two second metal spring pins 412 and the two third metal spring pins 413 are used to elastically contact the power supply module 50 to realize the electrical connection between the circuit board 41 and the power supply module 50. The two fourth metal spring pins 414 are used to elastically contact the touch assembly 43 to realize the electrical connection between the circuit board 41 and the touch assembly 43.

With continuous reference to FIGS. 5, 10 to 12 and FIGS. 14 to 16, in a possible embodiment, one of the two first metal spring pins 411 elastically contacts a positive electrode corresponding to the speaker electrical connector 32, and the other of the two first metal spring pins 411 elastically contacts a negative electrode corresponding to the speaker electrical connector 32, so that the circuit board 41 achieves electrical connection with the speaker body 31. One of the two second metal spring pins 412 elastically contacts a positive electrode corresponding to the battery electrical connector 511, and the other of the two second metal spring pins 412 elastically contacts a negative electrode corresponding to the battery electrical connector 511, so that the circuit board 41 achieves electrical connection with the battery 51. One of the two third metal spring pins 413 elastically contacts a positive electrode corresponding to the charging board electrical connector 521, and the other of the two third metal spring pins 413 elastically contacts a negative electrode corresponding to the charging board electrical connector 521, so that the circuit board 41 achieves electrical connection with the charging board 52. One of the two fourth metal spring pins 414 elastically contacts a positive electrode corresponding to the touch assembly 43, and the other of the two fourth metal spring pins 414 elastically contacts a negative electrode corresponding to the touch assembly 43, so that the circuit board 41 achieves electrical connection with the touch assembly 43.

Figure 17:
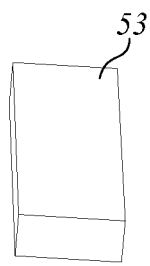
Figure 18:
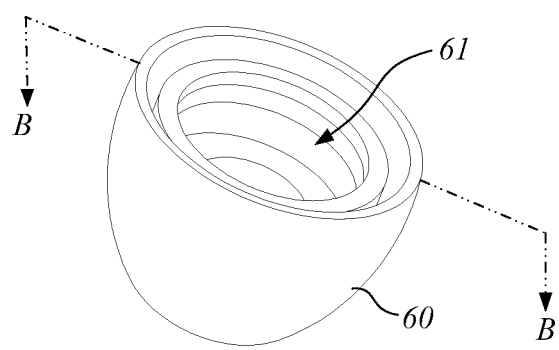
FIGS. 18 to 19 illustrate an ear cap of the earphone in FIG. 4.
Figure 19:
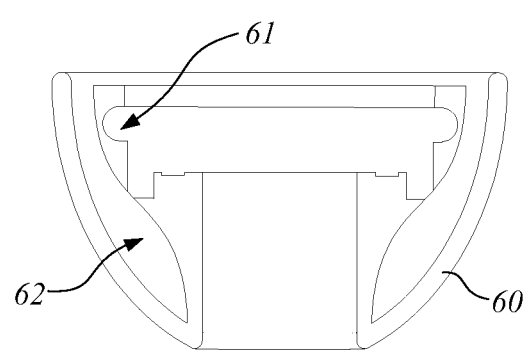

With reference to FIGS. 6 and 17, in a possible embodiment, the main receiving cavity 12 is formed inside with a magnetic block receiving groove 161. The power supply module 50 further includes a magnetic block 53. The magnetic block 53 is mounted within the magnetic block receiving groove 161. The magnetic block 53 is used to attach the earphone 200 to a charging stand provided externally. An edge of the magnetic block receiving groove 161 is provided with one or more magnetic block positioning members 162. The magnetic block positioning members 162 are used to define a position of the magnetic block 53.

With reference to FIGS. 5 to 7 and FIGS. 18 and 19, in a possible embodiment, the main housing 10 is provided outside with an annular convex strip 17. The ear cap 60 is provided inside with an annular recess 61. During the processing of assembling the ear cap 60 with the main housing 10, the annular convex strip 17 is snapped into the annular recess 61, so that the ear cap 60 is assembled with the main housing 10, and the ear cap 60 is not easily detached from the main housing 10. The ear cap 60 is provided inside with a buffer recess 62, and the buffer recess 62 is used to buffer an external auditory canal from being compressed by the ear cap 60 for improving the comfort of wearing.

Since the earphone 200 in the above embodiment realizes the fixation between the parts by means of snapping and positioning, the electrical connection between the parts by means of elastic contact, and reduces the use of hot pressing, bonding, and welding, the speaker module 30, the circuit module 40, the power supply module 50 and the ear cap 60 may be easily replaced.

Both the earphone 100 and the earphone 200 in the above embodiments have industrial applicability.

The above embodiments are merely illustrative and should not be considered as limiting the disclosure. This specification is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. Since the features of the disclosure can be implemented in several forms without departing from the features of the disclosure, it is to be understood that the above embodiments are not limited by any details of the foregoing description, and unless otherwise stated, they should be broadly considered to be within the scope defined by the appended claims. Therefore, all changes and modifications that fall within the scope and boundary of the claims, or their equivalents, are encompassed by the appended claims.

What is claimed is:

1. An earphone, comprising:
a main housing;
a cover;
a speaker module;
a circuit module; and
a power supply, wherein:
the cover is buckled on the main housing;
the speaker module, the circuit module, and the power supply are disposed within a space enclosed by the main housing and the cover;
the main housing is provided with a first snap hole seat, a second snap hole seat, a third snap hole seat and a fourth snap hole seat;
the first snap hole seat is disposed opposite to the second snap hole seat;

the third snap hole seat is disposed opposite to the fourth snap hole seat;
a distance between the first snap hole seat and the third snap hole seat is equal to a distance between the second snap hole seat and the third snap hole seat;
a distance between the first snap hole seat and the fourth snap hole seat is equal to a distance between the second snap hole seat and the fourth snap hole seat;
the cover is provided with a first snap buckle seat, a second snap buckle seat, a third snap buckle seat and a fourth snap buckle seat;
the first snap buckle seat is disposed opposite to the second snap buckle seat;
the third snap buckle seat is disposed opposite to the fourth snap buckle seat;
a distance between the first snap buckle seat and the third snap buckle seat is equal to a distance between the second snap buckle seat and the third snap buckle seat;
a distance between the first snap buckle seat and the fourth snap buckle seat is equal to a distance between the second snap buckle seat and the fourth snap buckle seat;
the first snap buckle seat is buckled with the first snap hole seat;
the second snap buckle seat is buckled with the second snap hole seat;
the third snap buckle seat is buckled with the third snap hole seat;
the fourth snap buckle seat is buckled with the fourth snap hole seat, so that the cover is buckled on the main housing;
the speaker module includes a speaker body and a speaker electrical connector;
the speaker body is used to convert electrical signals into sound waves;
the speaker electrical connector is used to achieve an electrical connection between the speaker body and the circuit module in an elastic contact manner;
the circuit module includes a circuit board, a microphone and a touch assembly;
the microphone is fixed on the circuit board and is electrically connected to the circuit board;
the circuit board is electrically connected to the speaker module, the power supply module and the touch assembly in the elastic contact manner;
the power supply module comprises a battery and a charging board;
the battery is used to store an electric energy;
the charging board is used to introduce an external charging power source into the circuit module;
one end of the battery is provided with a battery electrical connector;
the battery electrical connector is used to achieve electrical connection with the circuit board in the elastic contact manner;
one side of the charging board is provided with a charging board electrical connector;
another side of the charging board is provided with one or more charging couplers;
the charging board electrical connector is used to achieve electrical connection with the circuit board in the elastic contact manner;
the one or more charging couplers are used to connect externally a charging power source;
the circuit board is provided with two first metal spring pins, two second metal spring pins, two third metal spring pins, and two fourth metal spring pins;

the two first metal spring pins, the two second metal spring pins, and the two third metal spring pins are mounted on one face of the circuit board;
the two fourth metal spring pins are mounted on another face of the circuit board;
one of the two first metal spring pins elastically contacts a positive electrode corresponding to the speaker electrical connector, and the other of the two first metal spring pins elastically contacts a negative electrode corresponding to the speaker electrical connector, so that the circuit board achieves an electrical connection with the speaker body;
one of the two second metal spring pins elastically contacts a positive electrode corresponding to the battery electrical connector, and the other of the two second metal spring pins elastically contacts a negative electrode corresponding to the battery electrical connector, so that the circuit board achieves an electrical connection with the battery;
one of the two third metal spring pins elastically contacts a positive electrode corresponding to the charging board electrical connector, and the other of the two third metal spring pins elastically contacts a negative electrode corresponding to the charging board electrical connector, so that the circuit board achieves an electrical connection with the charging board; and
one of the two fourth metal spring pins elastically contacts a positive electrode corresponding to the touch assembly, and the other of the two fourth metal spring pins elastically contacts a negative electrode corresponding to the touch assembly, so that the circuit board achieves an electrical connection with the touch assembly.

2. The earphone in claim 1, wherein:
the main housing is formed with a speaker receiving cavity bulging outward and a main receiving cavity communicating with the speaker receiving cavity;
the speaker module is mounted within the speaker receiving cavity;
the circuit module and the power supply module are mounted within the main receiving cavity;
the main receiving cavity is provided inside with a first supporting column, a second supporting column, a third supporting column, and a fourth supporting column;
a distance from the first supporting column and the second supporting column to the speaker receiving cavity is shorter than a distance from the third supporting column and the fourth supporting column to the speaker receiving cavity;
the circuit board is provided with a first mounting hole, a second mounting hole, a third mounting hole, and a fourth mounting hole;
a distance between the first mounting hole and the second mounting hole is equal to a distance between the first supporting column and the second supporting column;
a distance between the third mounting hole and the fourth mounting hole is equal to a distance between the third supporting column and the fourth supporting column;
a distance between the first mounting hole and the third mounting hole is equal to a distance between the first supporting column and the third supporting column;
a distance between the second mounting hole and the fourth mounting hole is equal to a distance between the second supporting column and the fourth supporting column;
the first supporting column is inserted into the first mounting hole;

the second supporting column is inserted into the second mounting hole;

the third supporting column is inserted into the third mounting hole; and the fourth supporting column is inserted into the fourth mounting hole, so that the first supporting column, the second supporting column, the third supporting column, and the fourth supporting column support and position the circuit board.

3. The earphone in claim 1, wherein:

the cover is provided inside with a first positioning column, a second positioning column, a third positioning column, and a fourth positioning column;

the microphone is provided with a first positioning hole and a second positioning hole;

the touch assembly is provided with a third positioning hole and a fourth positioning hole;

the third positioning hole and the fourth positioning hole are located at one end of the touch assembly;

the first positioning column is inserted in the first positioning hole;

the second positioning column is inserted in the second positioning hole, so that a position of the microphone is fixed relative to the cover and the circuit board;

the third positioning column is inserted into the third positioning hole; and the fourth positioning column is inserted into the fourth positioning hole, so as to further define the position of the touch assembly within the cover.

4. The earphone in claim 1, wherein:

the snap buckle seat is provided with one or more snap buckles;

the snap hole seat is provided with one or more snap buckle mounting holes; and the one or more snap buckles are engaged into the snap buckle mounting holes.

5. The earphone in claim 1, wherein:

the main housing is formed inside with a charging board receiving groove;

the charging board receiving groove is used to mount the charging board;

the charging board receiving groove is provided inside with one or more through holes;

the one or more through holes are used to mount the charging couplers, so that the charging couplers are capable of externally connecting the charging power source;

the charging board receiving groove is provided inside with a charging board positioning column;

the charging board is provided with a charging board positioning hole; and the charging board positioning column is inserted into the charging board positioning hole, so as to further define a position of the charging board.

6. The earphone in claim 1, wherein:

a housing where the main housing is buckled to the cover is provided inside with a first buckling positioning column and a second buckling positioning column;

the first buckling positioning column and the second buckling positioning column are located at one side of the third snap hole seat, respectively;

the housing where the main housing is buckled to the cover is provided inside with a first buckling positioning hole and a second buckling positioning hole;

the first buckling positioning hole and the second buckling positioning hole are located at one side of the third snap buckle seat, respectively;

the first buckling positioning column is inserted into the first buckling positioning hole; and the second buckling positioning column is inserted into the second buckling positioning hole, so as to further achieve accurate positioning between the cover and the main housing.

7. The earphone in claim 1, wherein:

a housing on the main housing buckled to the cover is provided inside with a positioning step;

the housing on the cover buckled to the main housing is provided inside with one or more positioning bumps; and after the cover is buckled to the main housing, the one or more positioning bumps abut on the positioning step.

8. The earphone in claim 1, wherein:

the main housing is formed inside with a magnetic block receiving groove;

the power supply module further includes a magnetic block;

the magnetic block is mounted within the magnetic block receiving groove;

the magnetic block is used to attach the earphone to a charging stand provided externally;

an edge of the magnetic block receiving groove is provided with one or more magnetic block positioning members; and the one or more magnetic block positioning members are used to define a position of the magnetic block.

9. The earphone in claim 1, further comprising an ear cap, wherein:

the ear cap is provided inside with an annular recess;

the main housing is provided outside with an annular convex strip;

the annular convex strip is snapped into the annular recess, so that the ear cap is assembled with the main housing;

the ear cap is provided inside with a buffer recess; and the buffer recess is used to buffer an external auditory canal from being compressed by the ear cap.

10. The earphone in claim 1, wherein:

the cover is formed with a sound guide channel; and the sound guide channel faces towards the microphone, so that a sound wave reaches the microphone through the sound guide channel.

* * * * *